United States Patent [19]

Anderson

[11] Patent Number: 4,610,325
[45] Date of Patent: Sep. 9, 1986

[54] FUNCTION REVERSE APPARATUS FOR POWERED TRAILER

[76] Inventor: Rogers H. Anderson, 10501 Bloomington Freeway, Bloomington, Minn. 55420

[21] Appl. No.: 759,333

[22] Filed: Jul. 26, 1985

[51] Int. Cl.⁴ .............................................. B60D 1/14
[52] U.S. Cl. ................................ 180/14.2; 280/476 R
[58] Field of Search ................... 180/14.1, 14.2, 14.3, 180/14.6; 280/476 R, 476 A, 489, 497, 428, 432

[56] References Cited

U.S. PATENT DOCUMENTS

| | | | |
|---|---|---|---|
| 2,153,468 | 4/1939 | Heyn | 180/14.1 |
| 2,453,941 | 11/1948 | Smit | 280/489 |
| 2,630,871 | 3/1953 | Simpkins | 180/14.1 |
| 2,922,481 | 1/1960 | Hutter et al. | 180/14.6 |
| 3,035,653 | 5/1962 | Steepe | 180/14.2 |
| 3,578,096 | 5/1971 | Pearson | 180/14.6 |
| 3,695,373 | 10/1972 | Bostrom | 180/14.2 |
| 3,804,437 | 4/1974 | McCabe | 280/489 |
| 4,066,996 | 1/1978 | Davis | 280/432 X |
| 4,185,710 | 1/1980 | Kronogard | 180/14.2 |
| 4,195,861 | 4/1980 | Philipponi | 280/489 |
| 4,231,442 | 11/1980 | Birkeholm | 180/14.1 |
| 4,475,612 | 10/1984 | Anderson | 180/14.2 |
| 4,502,557 | 3/1985 | Anderson | 180/14.2 |

Primary Examiner—John J. Love
Assistant Examiner—Charles R. Watts
Attorney, Agent, or Firm—Kinney & Lange

[57] ABSTRACT

A powered trailer for aiding a powered vehicle in moving a load trailer is selectively connected to the vehicle by a tongue assembly. A sensing device mounted on the tongue assembly senses the position and motion of the vehicle relative to the powered trailer. Trailer engine speed and brake control devices control the engine and brakes of the powered trailer dependent on signals from the sensing device so that the engine and brakes of the powered trailer operate in coordination with those on the vehicle. The sensing device has operating modes for detecting relative motion when the powered trailer is traveling either in forward or rearward directions, and can be placed in an unactivated state in either mode. The sensing device cannot be changed from one mode to another without the sensing device being in its unactivated state.

14 Claims, 7 Drawing Figures

FUNCTION REVERSE APPARATUS FOR POWERED TRAILER

BACKGROUND OF THE INVENTION

1. Field of the Invention

The present invention relates to auxiliary powered units for assisting vehicles in moving load trailers. In particular, the present invention relates to an apparatus for reversing the functions of the control sensors for the engine and brakes of a powered trailer in relation to the directions of movement of the powered trailer.

2. Description of the Prior Art

Increased concerns about efficient energy consumption have led to the production of smaller and lighter automobiles. Such vehicles attain greater fuel efficiencies than previous models by having smaller engines, smaller bodies and many components made of lightweight materials. Because these lighter vehicles have smaller engines, their ability to pull trailers of any substantial load is greatly diminished. In addition, because such vehicles are so lightweight, substantial stress is created on a vehicle's frame when a heavy trailer is hitched thereto. Therefore, when a trailer of substantial load is to be moved by a small automobile, a booster source of power with means for preventing the weight of the trailer from being transferred completely onto the automobile frame is desired.

A powered trailer suitable for addressing these concerns is shown in U.S. Pat. Nos. 4,475,612 and 4,502,557, which are incorporated by reference herein. These patents show a powered trailer for aiding a vehicle in moving a load trailer. The powered trailer has a tongue assembly between the powered trailer and vehicle which prevents transfer of a substantial amount of tongue weight of the powered trailer to the vehicle and which has an apparatus for controlling the speed of the powered trailer dependent upon the position and motion of the vehicle relative to the powered trailer.

The powered trailer shown in these patents employs a two-part tongue assembly, with a first part thereof being attached to the vehicle and a second part thereof being attached to the powered trailer. Movement of the vehicle relative to the powered trailer moves the first part of the tongue assembly slidably relative to the second part. This movement is detected by the piston arm portions of a pair of opposed hydraulic actuators. One of these actuators is operably connected to the engine of the powered trailer, while the other is operably connected to the brake system of the powered trailer. The engine and brake system of the powered trailer are thus operated as a function of movement of the first and second members of the tongue assembly relative to one another.

The actuators are connected to the engine (via its carburetor) and brake systems of the powered trailer by hydraulic fluid lines. To allow the engine and brakes of the powered trailer to operate when the vehicle and powered trailer are moved in "reverse" (by placing the powered trailer in a reverse mode for transmission purposes), a four-way valve is provided in the hydraulic lines mentioned above to reverse the operable connections between the hydraulic actuators and the engine and brake system of the powered trailer. Thus, the hydraulic actuator that operates the carburetor of the engine when the powered trailer is in a mode for forward movement is changed, via the valve, to operate the brake system. Similarly, the hydraulic actuator which is operably connected to the brake system when the powered trailer is in a mode for forward movement is changed, by the valve, to operate the carburetor of the engine.

This system has been found impractical and unworkable through practice. The use of a valve which alternatively connects and disconnects hydraulic lines has been found to be an inefficient means for reversing the functions of the drive and braking systems of a powered trailer. Most notably is a problem which arises when the valve is operated to reverse these systems when the brakes are being applied or when the powered trailer is in a state of acceleration. Because hydraulic lines are involved, it is possible that the brake system will become stuck in a preloaded position or that the accelerator will be stuck in a preloaded position relative to normally desired hydraulic amplitudes for those systems. To this end, it is thus desirable to provide a more suitable means for reversing the functions of the engine acceleration and braking systems on a powered trailer which overcomes this inherent disadvantage of the prior art devices.

SUMMARY OF THE INVENTION

The present invention is an improvement for a powered trailer of the type having a main frame supported by wheels, with brakes and an engine thereon to drive said wheels. Such a powered trailer includes a tongue assembly for connecting the powered trailer to a lead vehicle with the tongue assembly including a first member adapted to be connected to the vehicle and a second member connected to the powered trailer. The first member is movable in a first direction and in a second opposite direction relative to the second member and the position and motion of the first member relative to the second member is dependent upon the position and motion of the lead vehicle relative to the powered trailer. First and second sensors are mounted with respect to the second member for detecting the position and motion of the first member relative to the second member with the first sensor operably connected to the engine of the powered trailer for increasing the speed of the engine when the first member moves in the first direction relative to the second member and decreasing the speed of the engine when the first member moves in the second direction relative to the second member. The second sensor is operably connected to the brakes of the powered trailer for braking the powered trailer when the first member moves in the second direction relative to the second member. The improvement comprises means for reversing the motion detection relationships of the first and second sensors with respect to the first member so that when the first sensor detects motion of the first member in the second direction, the engine speed is increased, when the first sensor detects motion of the first member in the first direction, the engine speed is decreased and when the second sensor detects motion of the first member in the first direction, the brakes are applied.

The present invention provides a relatively simple and durable means for reversing the motion detection relationships and thus the functions of the acceleration and braking sensors of a powered trailer. The present invention overcomes the disadvantages of the prior art with respect to such powered trailers while retaining the ability of a powered trailer to operate automatically to permit the powered trailer to simultaneously change its pulling or pushing power in coordination with the vehicle to ease the strain of pulling additional loads on said vehicle.

DETAILED DESCRIPTION OF THE PREFERRED EMBODIMENTS

Figure 1:
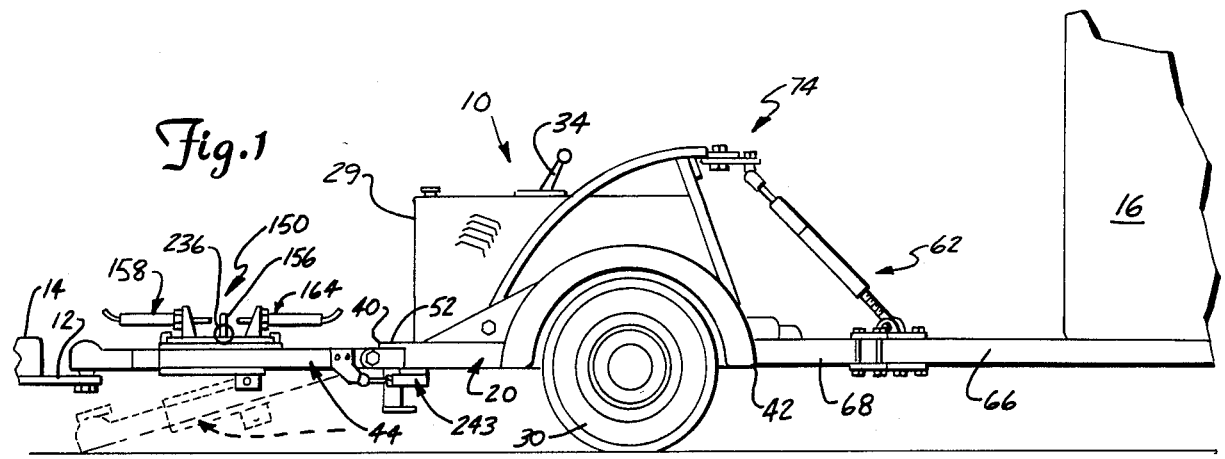
FIG. 1 (Sheet 1) is a side elevational view of the improved powered trailer of the present invention.

A powered trailer 10 is shown in FIG. 1 (Sheet 1) hitched between a trailer hitch 12 on a bumper 14 of a powered vehicle (not shown) and a load trailer 16. The powered vehicle can be any prime mover suitable for motive operation, such as an automobile or truck. The load trailer 16 can be any type of trailer, such as, for example, a boat trailer, a house trailer or a horse trailer. The powered trailer 10 is provided between the powered vehicle and load trailer 16 to aid the powered vehicle in moving the load trailer 16 in both forward and reverse directions (to the left or to the right, respectively, as viewed in FIGS. 1 and 2 (Sheet 1)).

To assist the powered vehicle 10 in moving the load trailer 16, the powered trailer 10 is provided with an engine 18. The engine 18 is mounted on a main frame 20 of the powered trailer 10. The engine 18 is preferably an internal combustion engine, and while the following description will be based upon the use of an internal combustion-type engine on the powered trailer 10, it is understood that any type of engine (such as an electric motor) would be suitable. As shown, a cowling or cover 29 is provided to protect the engine 18 and other mechanical portions of the powered trailer 10 from the elements.

A pair of wheels 30, 30 movably suport the main frame 20. The wheels 30 are drive wheels, being driven by the engine 18 through means for transmitting mechanical power from the engine 18 to the wheels 30, such as a hydrostatic transmission or an automatic transmission, as shown generally at 32. As on any automobile or truck, the transmission 32 can disengage the wheels 30 from the driving power of the engine 18 by suitable shifting control means, such as a gear shift lever 34. Normally, the gear shift lever 34 is located in the cab or on the instrument panel of a powered vehicle. However, since the powered trailer 10 is an unmanned or "driverless" vehicle, the shift lever 34 is shown adjacent the engine 18 and transmission 32. Of course, suitable control means can also be provided to permit remote operator control of the engagement and disengagement of the automatic transmission 32 with the engine 18 to control when power is applied to drive the wheels 30 and move the powered trailer 10.

The main frame 20 of the powered trailer 10 has a forward end 40 and a rearward end 42. A forward tongue assembly 44 is pivotally mounted on the main frame 20 adjacent the forward end 40 thereof. The tongue assembly 44 includes a yoke frame 46 having a central portion 55 with a plurality of frame members 48 extending rearwardly therefrom. As shown, the frame members 48 are connected to a pair of generally horizontally spaced legs 50, 50. The legs 50 extend rearwardly from the yoke frame 46 for pivotal mounting to a pair of ears 52, 52 extending forwardly adjacent the sides and forward end 40 of the main frame 20.

Figure 3:
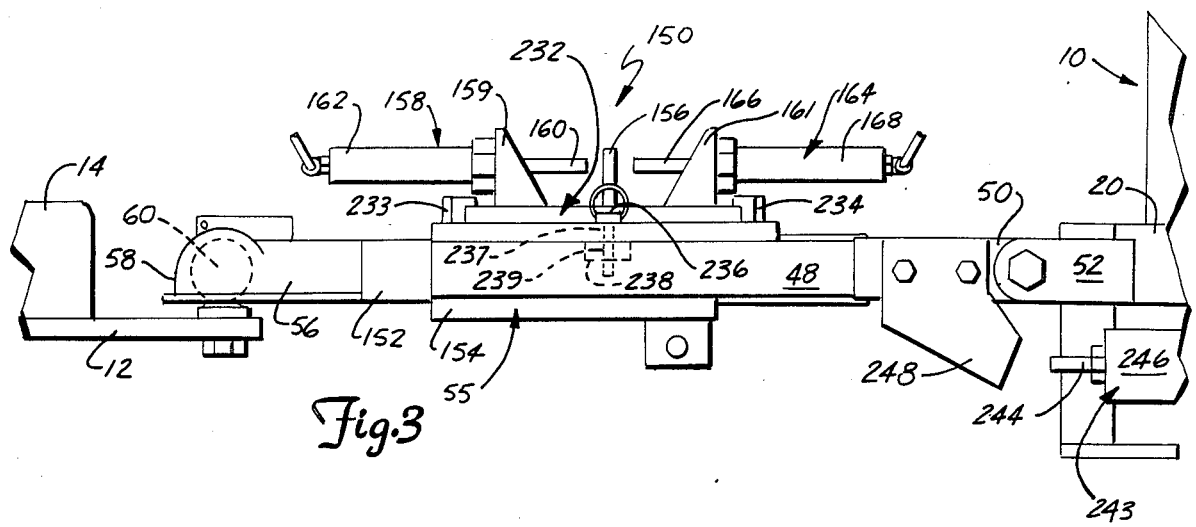
FIG. 3 (Sheet 2) is an enlarged side view of the tongue assembly of the powered trailer.
Figure 4:
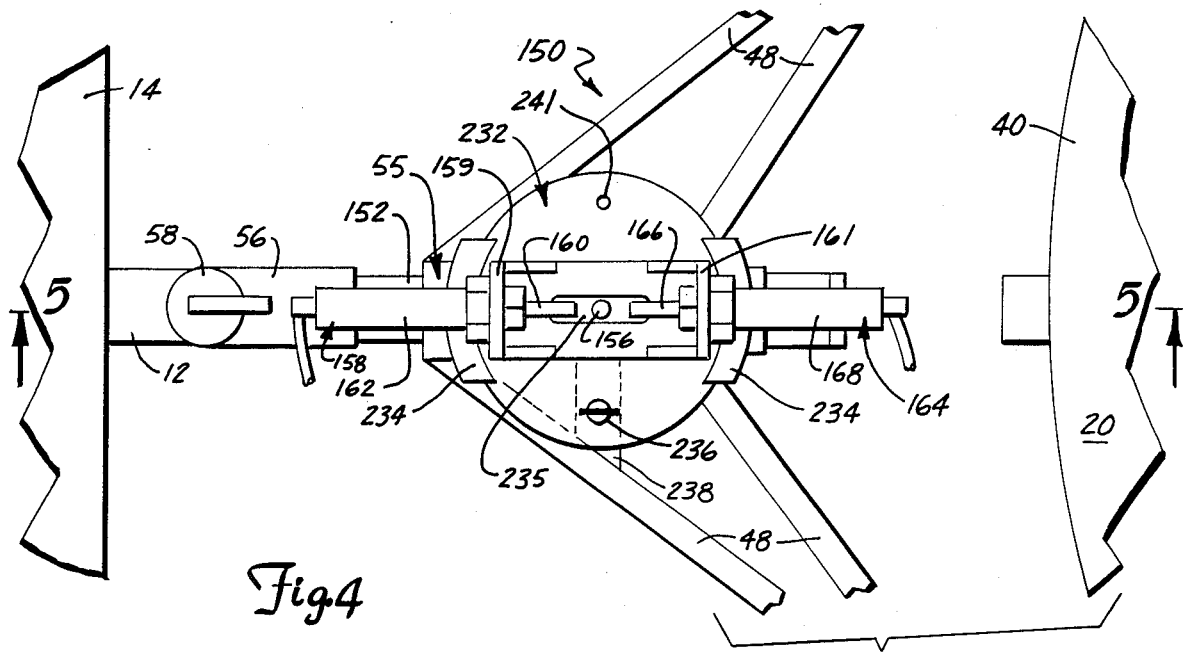
FIG. 4 (Sheet 2) is an enlarged top plan view of the tongue assembly, with some parts broken away.
Figure 5:
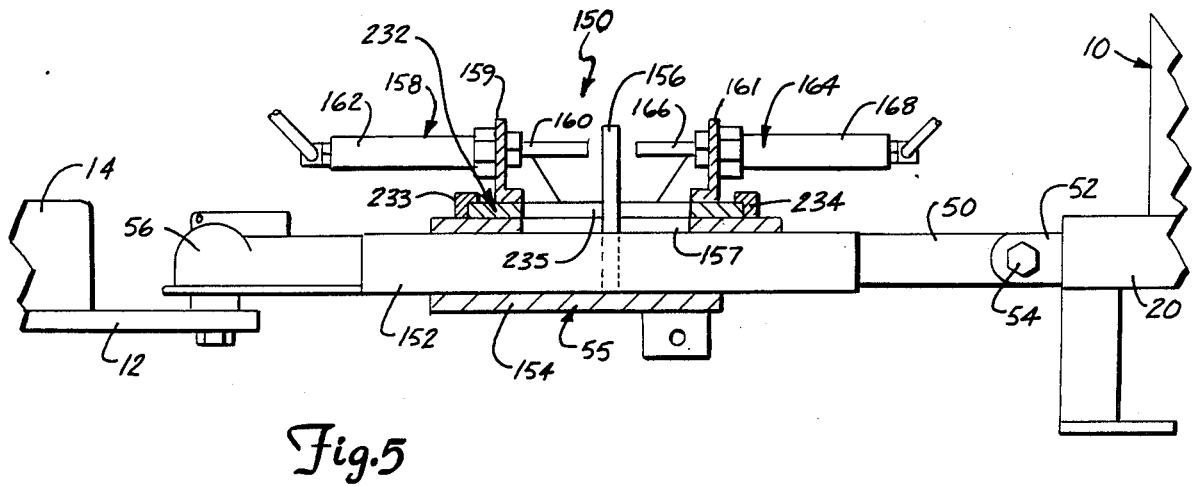
FIG. 5 (Sheet 2) is an enlarged side elevational view of the tongue assembly with some parts shown in section, as taken on line 5—5 in FIG. 4.

The tongue assembly 44 is shown in further detail in FIGS. 3-5 (Sheet 2). There it can be seen that the legs 50 are pivotally mounted to the ears 52 of the main frame 20 on a common generally horizontal axis by suitable fastening means, such as pivot pins 54. Thus, the tongue assembly 44 is pivotal with respect to the main frame 20 from an upper operating position to a lower stop position (shown in phantom in FIG. 1).

Extending forwardly from the central portion 55 of the yoke frame 46 is a hitch tongue 56 for selectively connecting the powered trailer 10 to the powered vehicle. Conventionally, the hitch tongue 56 has a circular cap portion 58 which is secured about a ball hitch 60 on the trailer hitch 12 of the powered vehicle as shown in FIG. 3. The tongue assembly 44 can thus pivot about a substantially vertical axis defined by the ball hitch 60.

Figure 2:
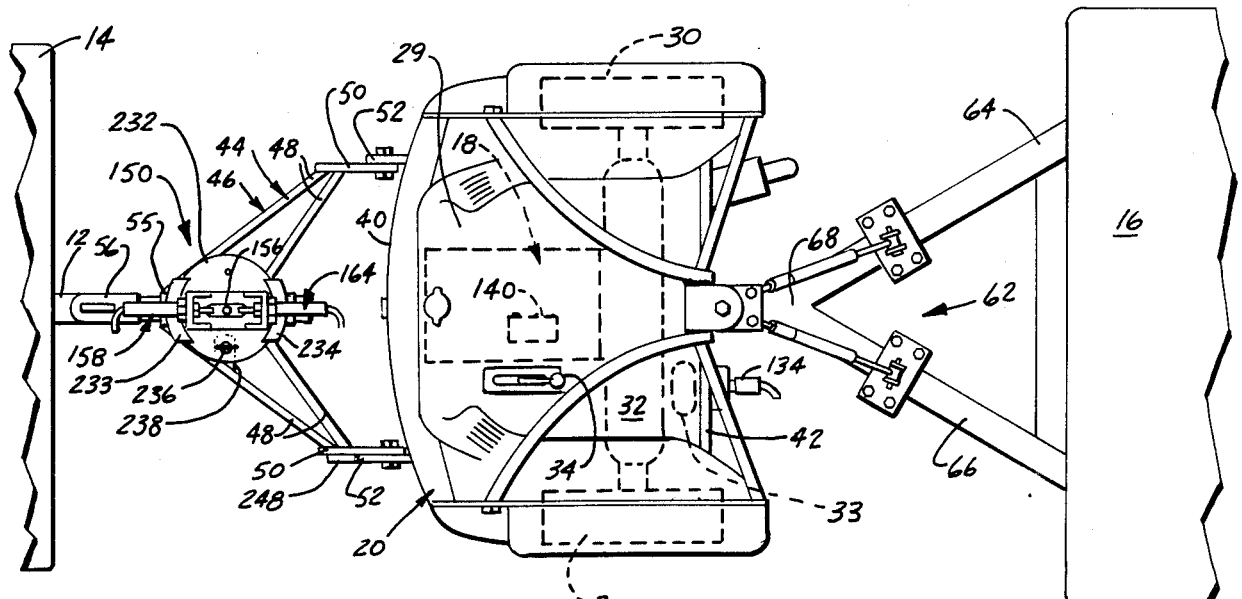
FIG. 2 (Sheet 1) is a top plan view of the powered trailer.

Because the tongue assembly 44 is pivotally mounted to the powered trailer 10, only a portion of the physical weight of the tongue assembly 44 is carried by the powered vehicle. When a load trailer 16 is secured to the rearward end 42 of the powered trailer as shown in FIGS. 1 and 2, the pivotal mounting of the tongue assembly 44 also acts to prevent the transfer of the weight of the load trailer 16 to the powered vehicle. Therefore, all of the weight of the load trailer 16 is supported by the powered trailer 10 and not transferred to the powered vehicle. As for the weight of the powered trailer 10, the only weight that is carried by the vehicle is a portion of the weight of the tongue assembly 44. The rest of the weight of the powered trailer 10 is carried by itself.

As shown in FIGS. 1 and 2, hitch means 62 are provided adjacent the rearward end 42 of the main frame 20 for connecting the powered trailer 10 to the load trailer 16. Conventionally, the load trailer 16 will have frame members 64 and 66 extending forwardly therefrom and joined at their forward ends to define a lead tongue assembly 68. The forward end of the lead tongue assembly 68 is selectively and pivotally secured by conventional means (such as a ball-type hitch) to the main frame 20 of the powered trailer 10. The hitch means 62 of the powered trailer 10 also includes a stabilizing hitch frame 74 extending rearwardly from the powered trailer 10 over the lead tongue assembly 68. The hitch frame 74 is pivotally secured to the frame member 64 and 66 and pivotally mounted to the main frame 20 to permit movement of the load trailer 16 relative to the powered trailer 10. The connection arrangement between the powered trailer 10 and load trailer 16 is designed to permit cornering and also to permit controlled lateral pivoting of the load trailer 16 with respect to the powered trailer 10 as the trailers are moved over terrain which is laterally uneven.

The load trailer 16 is selectively connected to the main frame 20 of the powered trailer 10 by what is essentially a three-part hitch consisting of the hitch means 62 and hitch frame 74. The tongue weight of the load trailer 16 is thus placed on the main frame 20. The powered trailer 10, in turn, is selectively connected to the powered vehicle by the tongue assembly 44. Because the tongue assembly 44 is pivotally mounted on a generally horizontal axis to the forward end 40 of the main frame 20, the tongue weight placed on the powered vehicle by the combination of the powered trailer 10 and load trailer 16 is relatively small. The weight of the trailers 10 and 16 is not passed to the powered vehicle; rather, all of the weight of the load trailer 16, and nearly all of the weight of the powered trailer 10, is supported by the powered trailer 10. This arrangement allows a small vehicle to pull a load trailer 16 of substantial weight without placing excessive tongue weight on the vehicle.

Figure 6:
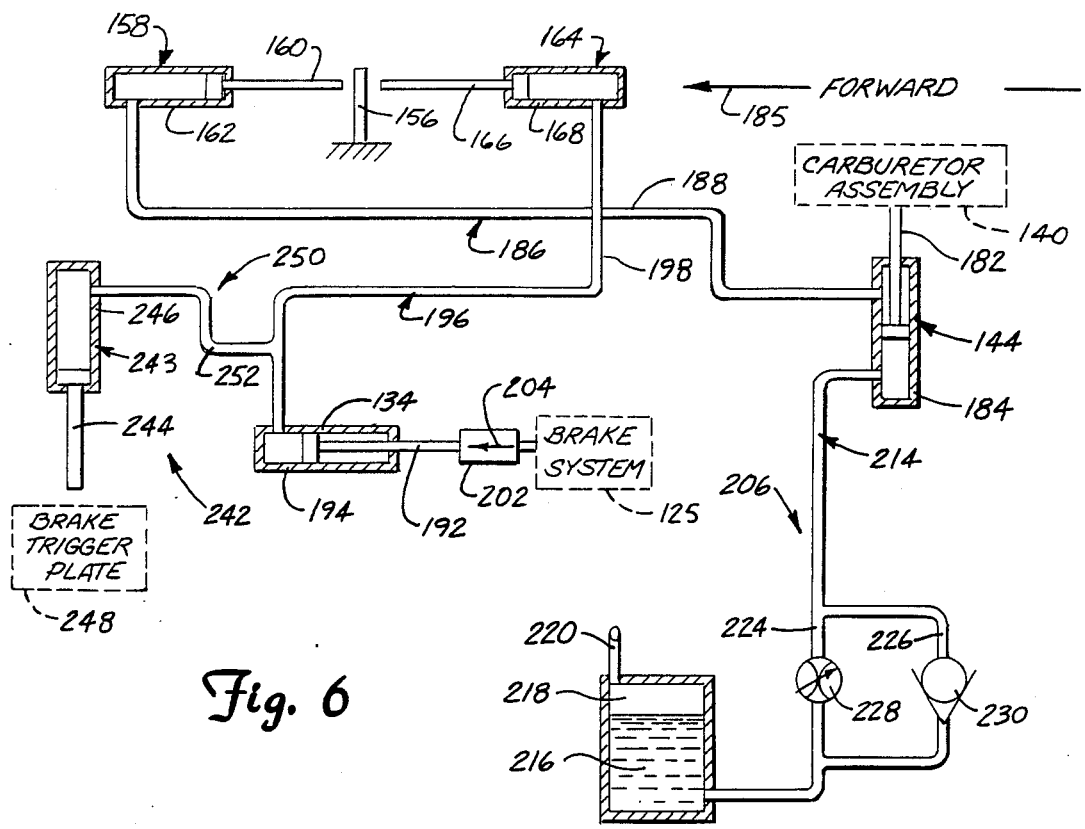
FIG. 6 (Sheet 3) is a schematic view of the hydraulic system on the powered trailer when the powered trailer is operated to move forwardly (to the left as in FIG. 1).
Figure 7:
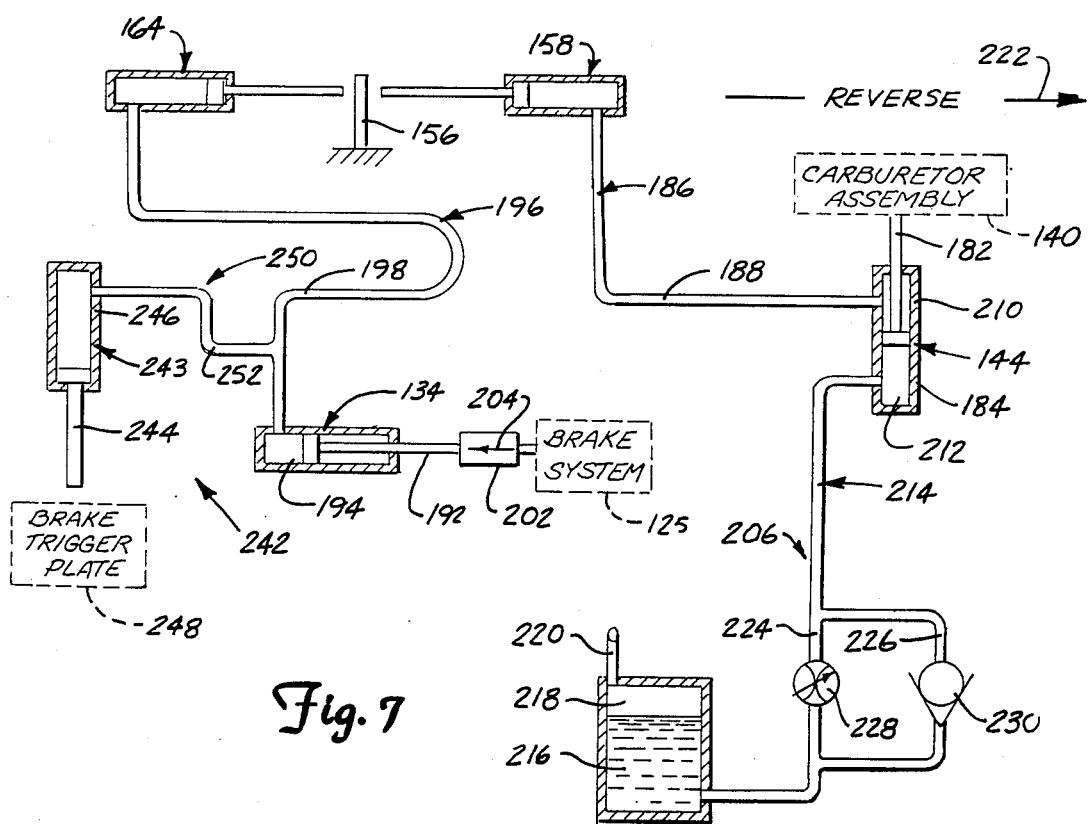
FIG. 7 (Sheet 3) is a schematic view of the hydraulic system on the powered trailer when the powered trailer is operated to move rearwardly (to the right as in FIG. 1).

Not only is the powered vehicle 10 provided with an engine 18, but it also has brakes to slow or stop the powered trailer's movement. On the powered trailer 10 of the present invention, a brake system 125 (FIGS. 6 and 7 (Sheet 3)) can be either disc brake or conventional shoe brake systems operably connected to the wheels 30 of the powered trailer 10. The brake system 125 of the powered trailer 10 is operated by conventional fluid pressure means, shown generally as cylinder drum 133 in FIG. 2. The brake system 125 is activated by a hydraulic brake actuator 134 which is operably connected to the cylinder drum 133, as shown in FIGS. 2, 6 and 7.

When the engine 18 on the load trailer 10 is an internal combustion engine, the speed of the engine 18 is controlled by a standard carburetor assembly 140 on the engine 18. As shown in FIGS. 6 and 7, the carburetor assembly 140 is operably connected to a hydraulic carburetor actuator 144. Activation of the carburetor actuator 144 thus controls the acceleration and deceleration of the engine 18.

Position sensing means 150 on the tongue assembly 44 controls the operations of the hydraulic brake actuator 134 and hydraulic carburator actuator 144. A first inner member 152 of the tongue actuator 44 is adapted to be connected to the powered vehicle by the hitch tongue 56. The central portion 55 of the tongue assembly 44 has a second outer member 154 which is fixedly secured to the frame members 48. The first member 152 is slidable in a telescoping manner with respect to the second member 154 in a first direction (to the left, as viewed in FIGS. 1-5) and in a second, opposite direction (to the right, as viewed in FIGS. 1-5). Since the first member 152 is connected to the powered vehicle and the second member 154 is not, the position and motion of the first member 152 relative to the second member 154 is dependent upon the position and motion of the powered vehicle relative to the powered trailer 10.

A control pin 156 is fixedly mounted on the first member 152 and slides in a longitudinal slot 157 in the second member 154 when the first member 152 slides with respect to the second member 154. A first hydraulic actuator 158 has a piston rod 160 and a cylinder portion 162, with its cylinder portion 162 mounted on a mounting bracket 159. The mounting bracket 159 is selectively securable with respect to the second member 154 in a manner explained below. As seen in FIGS. 1-6, the first actuator 158 is positionable such that its piston rod 160 extends in direction to engage the control pin 156 when the control pin 156 moves in the first direction in the slot 157. Thus, when the first member 152 slides in the first direction relative to the second member 154, the control pin 156 pushes the piston rod 160 into the cylinder portion 162 of the first actuator 158.

A second actuator 164 is also mounted with respect to the second member 154 adjacent the control pin 156. The second actuator 164 has a piston rod 166 and a cylinder portion 168 with its cylinder portion 168 mounted on a mounting bracket 161. The mounting bracket 161, like the mounting bracket 159, is selectively securable with respect to the second member 154 in a manner explained below. As seen in FIGS. 1-6, the second actuator 164 is also positionable such that its piston rod 166 extends in direction to engage the control pin 156 when it moves in the second direction in the slot 157. Thus, when the first member 152 slides in the second direction relative to the second member 154, the control pin 156 pushes the piston rod 166 into the cylinder portion 168 of the second actuator 164.

Thus, as shown in FIGS. 1-6 and described, movement or motion of the first member 152 relative to the second member 154 of the tongue assembly 44 pushes the piston rod of either the first actuator or second actuator (depending upon the direction of motion) into its respective cylinder portion. This position sensing means 150 (which includes the first and second members 152 and 154 and the first and second actuators 158 and 164), senses the position and motion of the first member 152 relative to the second member 154. Movement of the powered trailer 10 is thus controlled by the position sensing means 150, which is operably connected to the engine 18 and the brake system 125.

The speed of the engine 18 is controlled dependent upon the position and motion of the first member 152 relative to the second member 154. The hydraulic carburetor actuator 144 has a piston rod 182 and a cylinder portion 184, with the piston rod 182 being operably connected to the carburetor assembly 140. Movement of the piston rod 182 of the carburetor actuator 144 into its respective cylinder portion 184 activates the carburetor assembly 140 to accelerate the engine 18. Motion of the piston rod 182 away from the cylinder portion 184 decelerates the engine 18.

When the powered trailer 10 is to be operated in a first forward direction (as indicated by forward arrow 185 in FIG. 6), the cylinder portion 162 of the first actuator 158 is sealably connected to the cylinder portion 184 of the carburetor actuator 144. These cylinder portions 162 and 144 are connected by a first fluid hydraulic connection means 186, which include a first flow line 188. Thus, movement of the piston rod 160 of the first actuator 158 into its respective cylinder portion 162 forces hydraulic fluid through the first flow line 188 to the cylinder portion 184 of the carburetor actuator 144 to move its respective piston rod 182 into the cylinder portion 184. This activates the carburetor assembly 140 to accelerate the engine 18. The movement of the piston rod 160 is caused by the control pin 156 moving in the first forward direction with the first member 152. Such motion is caused when the powered vehicle accelerates, pulling the first member 152 with it while the inertia of the second member 154 and the powered trailer 10 cause them to lag slightly behind. The control pin 156 pushes the piston rod 160 of the first actuator 158 inwardly to accelerate the engine 18 and bring the powered trailer 10 into operational coordination and even speed and acceleration with the powered vehicle.

Of course, motion of the first member 152 in a second, opposite direction relative to the second member 154 decreases the speed of the engine 18.

To slow or stop the powered trailer 10 when it is moving in the first forward direction with the powered vehicle, the brake system 125 of the powered trailer 10 is be activated by the position sensing means 150. The brake system 125 is also controlled dependent upon the position and motion of the first member 152 relative to the second member 154. The hydraulic brake actuator 134 which controls the brake system 125 of the powered trailer 10 has a piston rod 192 and a cylinder portion 194. The piston rod 192 of the brake actuator 134 is operably connected to the brake system 125 of the powered trailer 10 such that movement of the piston rod 192 into its respective cylinder portion 194 activates the brakes system 125 to limit movement of the powered trailer 10.

The cylinder portions 168 and 194 of the second actuator 164 and brake actuator 134, respectively, are sealably connected by a second hydraulic fluid connection means 196, which includes a second flow line 198. Thus, movement of the piston rod 166 of the second actuator 164 into its respective cylinder portion 168 forces hydraulic fluid through the second flow line 198 to the cylinder portion 194 of the brake actuator 134 to move its respective piston rod 192 away from the cylinder portion 194. This activates the brake system 125 to stop or slow the powered trailer 10. The movement of the piston rod 166 is caused by the control pin 156 moving in the second direction with the first member 152. Such motion is caused when the powered vehicle slows down, holding the first member 152 in position while the inertia of the second member 154 and powered trailer 10 cause them to be urged toward the powered vehicle. The control pin 156 pushes the piston rod 166 of the second actuator 164 inwardly to activate the brake system 125 and bring the powered trailer 10 into operational coordination and even speed and deceleration with the powered vehicle.

Spring or bias means 202 are provided for constantly urging the piston rod 192 of the brake actuator 134 toward its respective cylinder portion 194 (so that the brake system 125 is normally in an unactivated state). The bias means 202 pushes the piston rod 192 in direction best shown by arrow 204 in FIGS. 6 and 7. The brake system 125 is activated only when the force of the hydraulic fluid on the cylinder portion 194 of the brake actuator 134 overcomes the urging force of the bias means 202 on the piston rod 192. Thus, unless the brake actuator 134 is activated sufficiently to overcome the urging force of the bias means 202, the powered trailer 10 will move freely.

The carburetor actuator 144 is provided with a fluid pressure bias means 206 for constantly urging its piston rod 182 in a selected direction. Preferably, the pressure bias means 206 urges the piston rod 182 away from its respective cylinder portion 184 so that the engine 18 accelerates only when the force of the hydraulic fluid on the cylinder portion 184 of the carburetor actuator 144 overcomes the urging force of the pressure bias means 206. The pressure bias means 206 also acts as a damper to limit excessive movement of the control pin 156 during operation to prevent needless acceleration and deceleration of the engine 18.

As shown in FIGS. 6 and 7, the carburetor actuator 144 is a double-acting hydraulic actuator, with its cylinder portion 184 having a piston rod retraction chamber 210 and a separate piston rod extension chamber 212. The first flow line 188 is sealably connected to the piston rod retraction chamber 210. One end of a third fluid connection means 214 is sealably connected to the piston rod extension chamber 212 of the carburetor actuator 144, with the other end being connected to a hydraulic fluid reservoir 216. The amount of pressure of the hydraulic fluid in the reservoir 216, third fluid connection means 214 and piston rod extension chamber 212 is controlled by varying the pressure in an upper compressed air portion 218 of the reservoir 216. A pressure valve 220 is connected to the air pressure portion 218 of the reservoir 216 so that the application or release of compressed air through the valve 220 varies the pressure of the hydraulic fluid in the reservoir 216. This regulates the force of the fluid in the piston rod extension chamber 212 acting on the piston rod 182 to urge it away from the respective cylinder portion 184. Thus, the carburetor assembly 140 is normally urged to an unaccelerated or idling position by the pressure bias means 206, rather than a throttle open acceleration position. The percentages of respective trailer load that are pulled (or pushed) by the powered vehicle and load trailer 10 can be preset by adjusting the compressed air pressure in the reservoir 216. For example, the load trailer 10 will provide a greater percentage of the pulling power if the pressure in the air pressure portion 218 is raised. Such adjustment in pulling percentage may be desirable in certain highway conditions, such as steep grades. When the summit is reached, the compressed air pressure can be reduced to attain a desired level for normal highway driving.

To accelerate the engine 18, the pressure in the piston rod retraction chamber 210 must be greater than the pressure in the piston rod extension chamber 212 (to cause movement of the piston rod 182 toward its respective cylinder portion 184). The third fluid connection means 214 includes a third flow line 224 and a fourth flow line 226. A variable needle valve 228 is positioned in the third flow line 224, and a one-way check valve 230 is positioned in the fourth flow line 226. As shown in FIGS. 6 and 7, the fourth flow line 226 is connected to the third flow line 224 so that the needle valve 228 and the check valve 230 are in parallel, with the fourth flow line 226 being connected to the third flow line 224 above and below the needle valve 228. This valve arrangement prevents rapid acceleration of the engine 18 by limiting the ability of the piston rod 182 to move into the cylinder portion 184 since the flow of fluid from the piston rod extension chamber 212 to the reservoir 216 is limited by the needle valve 228. During deceleration, however, the flow of fluid from the reservoir 216 to the piston rod extension chamber 212 is unrestricted through the one-way check valve 230.

Discussion to this point has centered on the operation of the powered trailer in the first forward direction. The powered trailer 10 is provided with reverse operation means so that the engine 18 can also apply power to the wheels 30 to move the powered trailer 10 in a reverse direction (as shown generally by reverse arrow 222 in FIG. 7).

Since the acceleration of the engine 18 is based upon the motion and position of the control pin 156 relative to the hydraulic actuators 158 and 162, it is necessary to simultaneously reverse the functions of the brake system 125 and engine 18 in order to obtain controlled movement of the powered trailer 10 in the reverse direction. In prior versions of this type of powered trailer (such as those shown in U.S. Pat. Nos. 4,475,612 and 4,502,557), this was done by reversing the hydraulic connections with a valve. Such an arrangement required multiple sealings and resealings of hydraulic flow lines as the valve was operated, and if the valve was turned or reversed when either of the hydraulic actuators 158 or 162 was in engagement with the control pin 156, the result was an artificial pressurization or preloading of particular hydraulic lines affected.

These inherent disadvantages with the prior art are overcome by the reverse operation means of the present invention. A rotatable plate or turntable 232 is mounted on the central portion 55 of the second member 154. As shown in FIGS. 3-5, the control pin 156 is positionable in a "home position" wherein it does not engage either of the piston rod portions of the hydraulic actuators 158 or 164 (and thus does not activate in any manner the engine or brakes of the powered trailer). This home position is attained by moving the first member 153 (upon which the control pin 156 is mounted) relative to the second member 154. The plate 232 is mounted on the central portion 55 to rotate about an axis aligned vertically with the control pin 156 when it is positioned in its home position. The plate 232 is held to rotate about this vertical axis with respect to the control pin by suitable means, such as plate mounting brackets 233 and 234, both of which are secured to the central portion 55.

Plate 232 also has a slot 235 which is similar in configuration to the slot 157 in the central member 55. In FIGS. 1-6, the plate 232 is shown in position to align its slot 235 with slot 157 and place the hydraulic actuators 158 and 164 in their first sensing positions. Plate 232 is rotatable 180 degrees to place the actuators mounted thereon in a second sensing position as illustrated in FIG. 7 (wherein the positions of the hydraulic actuators 158 and 164 are reversed in relation to the home position of control pin 156. In either position of the mounting plate 232, the control pin 156 is movable within the slots 157 and 235 in the first and second directions and can engage the piston rod portion of either actuator 158 or 164 to activate said actuator relative to the engine or brakes, respectively.

Plate 232 is positioned and retained for holding the actuators in their first and second sensing portions by suitable locking means. As shown, the locking means can be merely a pin 236 which is retained in a first hole 237 and lock bracket 238. The lock bracket 238 is fixedly mounted between the central member 55 and one of the frame members 48, and has an aperture 239 for locking reception of the pin 236 when aligned in the first hole 237 of the plate 232 as shown in FIGS. 3 and 4. When the plate 232 is rotated 180 degrees, a second hole 241 in the plate 232 is brought into alignment with the aperture 239 in the lock bracket 238. The pin 236 can then be aligned therein to lock the plate 232 with respect to the second sensing position of the actuators 158 and 164.

When the plate 232 is positioned and retained to hold the actuators in either their first or second sensing positions, slot 235 permits movement of the control pin 156 in the first and second directions for engagement with the piston rod portions of the actuators 158 and 164. In order to rotate the plate 232, the control pin 156 must be in its home position between the piston rod portions 160 and 166 of the actuators 158 and 164, respectively (as shown in FIGS. 3-5). Any attempt to rotate the plate 232 when the control pin 156 is not in its home position meets with resistance by the control pin 156 and thereby limits rotation of the plate 232. Sufficient force on the plate 232 can move the control pin 156 to its home position, but in doing so, must also move the powered trailer 10 with respect to the vehicle, since movement of the control pin 156 relative to the plate 232 necessarily moves the first member 152 with respect to the second member 154 of the tongue assembly 44. Thus, rotation of the mounting plate 232 is limited when the control pin 156 is not in its home position and the actuators 158 and 164 are activated to any extent by engagement with the control pin 156. Plate 232 and slot 235 thus provide means for preventing the reversing of the motion detection relationships of the actuators 158 and 164 until the actuators are placed in an unactivated state whereby the control pin 156 is between the actuators as illustrated in FIGS. 3-5.

As shown, the plate 232 is rotated manually. It is contemplated that mechanical means, such as a remote motor or hydraulic arrangement can be employed to rotate the plate 232 between the first and second sensing positions. The turning of the plate 232 could then be operated remotely, for example, by the driver of the lead vehicle. An indicator is also contemplated to indicate to the driver the relative sensing portions of the actuators. It is further contemplated that the transmission of the lead vehicle can be operably connected to the plate rotation and locking arrangement so that the lead vehicle would not be inadvertently placed in forward while the powered trailer is placed in reverse, or vice versa.

The powered trailer 10 is thus provided with suitable means for reversing the motion detection relationships of the first and second actuators 158 and 164 via the rotatable plate 232. For controlled acceleration and braking in the forward direction, the actuators 158 and 165 are positioned as shown in FIG. 6 to connect the first flow line 188 to the carburetor actuator 144. In this position, the second flow line 198 is connected to the brake actuator 134.

For reverse operation of the powered trailer 10, the relative positions of the actuators 158 and 164 are reversed to the position as shown in FIG. 7. The hydraulic connections between the relative components of the powered trailer 10 are not at all affected by this change in physical arrangement and there is no sealing or resealing of hydraulic lines required. Reversal of actuator positions, however, reverses the motion detection relationship between the first and second members 152 and 154 of the powered trailer tongue assembly 44. Movement of the control pin 156 in the first direction (now toward the second actuator 164) activates the brake system 125 of the powered trailer 10 and movement of the control pin 156 in the second direction (now toward the first actuator 158) activates the carburetor actuator 144 to increase the speed of the engine 18. The brake system 125 and engine 18 are in complete reverse operation for moving the powered trailer 10 backwards (to the right as viewed in the FIGS.).

The reversing of the motion detection relationships between the hydraulic actuators and the control pin 156 is also achievable in a manner wherein the actuators are not physically moved. A suitable arrangement (not shown) is contemplated to reverse the direction of pin 156 movement in response to movement of the first member 152 relative to the second member 154. As shown, the pin 156 is fixedly mounted to the first member 152. However, the pin 156 can be mounted in a manner such that it could be selectively moved in an inverse relationship to movement of the first member 152 with respect to the second member 154 to thereby reverse the motion detection relationships of the actuators 158 and 164 relative to motion of the pin 156.

There is the possibility (though remote) that during operation, the powered trailer 10 may become accidentally separated from the powered vehicle. The resultant danger from having a driverless powered device pulling a load trailer on the highway is quite obvious. Thus, an emergency brake system 242 is provided on the powered trailer 10 which will automatically activate the brake system 125 if the powered trailer 10 becomes disengaged from the powered vehicle.

The emergency brake system 242 is activated by the downward pivoting of the tongue assembly 44 (to its lower stop position) that would occur if it became disengaged from the powered vehicle. A tongue hydraulic actuator 243 has a piston rod 244 and a cylinder portion 246, with the cylinder portion 246 being fixedly mounted on the main frame 20 adjacent its forward end 40. The tongue actuator 243 is positioned such that its piston rod 244 extends in direction to engage a brake trigger plate 248 mounted on the tongue assembly 44, as best shown in FIGS. 1 and 3. As the tongue assembly 44 pivots downwardly about the generally horizontal axis defined by the pivot pins 54, the trigger plate 248 contacts the piston rod 244 of the tongue actuator 243 and pushes it into its respective cylinder portion 246. The emergency brake system 242 also acts as a parking brake for the load trailer 10. When the powered vehicle is unhitched from the load trailer 10, the tongue assembly 44 drops to its lower stop position to effectively restrict any movement of the powered trailer 10.

A fourth hydraulic fluid connection means 250 sealably connects the cylinder portions 246 and 194 of the tongue actuator 243 and brake actuator 134, respectively. The fourth hydraulic fluid connection means 250 includes a fifth flow line 252 and a portion of the second flow line 198, as shown in FIGS. 6 and 7. Movement of the piston rod 244 of the tongue actuator 243 into its respective cylinder portion 246 causes hydraulic fluid to force the piston rod 192 of the brake actuator 134 away from its cylinder portion 194 to overcome the force of the bias means 202 and activate the brake system 125. As shown in FIGS. 6 and 7, the first actuator 158, second actuator 164, and tongue actuator 243 are normally positioned with their respective piston rods in fully extended positions. Thus, when the actuators 158 and 164 are positioned for forward movement (as in FIG. 6), no pressure will be absorbed in the second actuator 164 if the tongue actuator 243 is activated. All pressure build-up goes to move the piston rod 192 of the brake actuator 134. Conversely, if the second actuator 164 is activated, all pressure build-up goes to the cylinder portion 194 of the brake actuator 134 rather than being absorbed in the tongue actuator 243. The same result is obtained when actuators 158 and 164 are positioned for reverse movement (as in FIG. 7).

Although the present invention has been described with reference to preferred embodiments, workers skilled in the art will recognize that changes may be made in form and detail without departing from the spirit and scope of the invention.

I claim:

1. In a powered trailer of the type having a main frame supported by wheels with brakes, an engine thereon to drive said wheels, a tongue assembly for connecting the powered trailer to a lead vehicle with the tongue assembly including a first member adapted to be connected to the vehicle and a second member connected to the powered trailer, the first member having a control pin fixedly mounted thereon and being movable in a first direction and in a second opposite direction relative to the second member and the position and motion of the first member relative to the second member being dependent on the position and motion of the lead vehicle relative to the powered traler, and with first and second hydraulic actuators for detecting the position and motion of the first member relative to the second member, the first hydraulic actuator having a piston rod and a cylinder portion, the cylinder portion of the first actuator being mounted with respect to the second member of the tongue assembly in a first sensing position with its piston rod extending in a direction to engage the control pin on the first member so that movement of the first member in the first direction relative to the second member causes retraction of the piston rod into the cylinder portion of the first actuator, and the first actuator being operably connected to the engine of the powered trailer for increasing the speed of the engine when the first member moves in the first direction relative to the second member and decreasing the speed of the engine when the first member moves in the second direction relative to the second member, and the second hydraulic actuator having a piston rod and a cylinder portion, the cylinder portion of the second actuator being mounted with respect to the second member of the tongue assembly in a first sensing position with its piston rod extending in a direction to engage the control pin on the first member so that movement of the first member in the second direction relative to the second member causes retraction of the piston rod into the cylinder portion of the second actuator, and the second actuator being operably connected to the brakes of the powered trailer for braking the powered trailer when the first member moves in the second direction relative to the second member, the improvement which comprises:

means for reversing the motion detection relationships of the first and second hydraulic actuators with respect to the first member so that when the first actuator detects motion of the first member in the second direction the engine speed is increased, when the first actuator detects motion of the first member in the first direction the engine speed is decreased and when the second actuator detects motion of the first member in the first direction the brakes are applied, the reversing means including means for pivotally mounting the first and second hydraulic actuators with respect to the second member for simultaneously:

(a) placing the first hydraulic actuator in a second sensing position with its piston rod extending in direction to engage the control pin on the first member so that movement of the first member in the second direction relative to the second member causes retraction of the piston rod into the cylinder portion of the first actuator, and (b) placing the second hydraulic actuator in a second sensing position with its piston rod extending in direction to engage the control pin on the first member so that movement of the first member in the first direction relative to the second member causes retraction of the piston rod into the cylinder portion of the second actuator.

2. The powered trailer of claim 1 wherein the first member has a home position relative to the second member where the control pin is positioned so that neither piston rod of the first and second actuators is retracted within its respective cylinder portion, and wherein the pivotal mounting means comprises:
  a mounting plate for the first and second actuators which is rotatable with respect to the second member about an axis defined by the control pin when the first member is in its home position.

3. The powered trailer of claim 2, and further comprising:
  locking means for selectively restricting rotation of the mounting plate relative to the second member.

4. The powered trailer of claim 3 wherein the locking means retains the mounting plate in two positions, a first position wherein the first and second actuators are in their first sensing positions and a second sensing position wherein the first and second actuators are in their second sensing positions.

5. The powered trailer of claim 2, wherein the control pin extends through an opening in the mounting plate, and said opening is configured as a slot to permit movement of the control pin in the first and second directions with respect to the mounting plate when the first and second actuators are in their first and second sensing positions.

6. The powered trailer of claim 5 wherein the control pin and slot are configured to move the first member toward its home position when the mounting plate is rotated.

7. The powered trailer of claim 1 wherein the first member has a home position relative to the second member where the control pin is positioned so that neither piston rod of the first and second actuators is retracted within its respective cylinder portion, and wherein the pivotal mounting means includes means for placing the first member adjacent its home position as the actuators are moved between their first and second sensing positions.

8. In a powered trailer of the type having a main frame supported by wheels with brakes, an engine thereon to drive said wheels, a tongue assembly for connecting the powered trailer to a lead vehicle with the tongue assembly including a first member adapted to be connected to the vehicle and a second member connected to the powered trailer, the first member being movable in a first direction and in a second opposite direction relative to the second member and the position and motion of the first member relative to the second member being dependent on the position and motion of the lead vehicle relative to the powered trailer, with the first and second sensors for detecting the position and motion of the first member relative to the second member, the first sensor operably connected to the engine of the powered trailer for increasing the speed of the engine when the first member moves in the first direction relative to the second member and decreasing the speed of the engine when the first member moves in the second direction relative to the second member and the second sensor operably connected to the brakes of the powered trailer for braking the powered trailer when the first member moves in the second direction relative to the second member, and with the first member having a home position relative to the second member where both sensors are in an unactivated state relative to the engine and brakes, the improvement which comprises:

means for reversing the motion detection relationships of the first and second sensors with respect to the first member so that when the first sensor detects motion of the first member in the second direction the engine speed is increased, when the first sensor detects motion of the first member in the first direction the engine speed is decreased and when the second sensor detects motion of the first member in the first direction the brakes are applied; and means for preventing the reversing of the motion detection relationships of the first and second sensors by the motion detection reversing means until each sensor is placed in its unactivated state.

9. The powered trailer of claim 8 wherein the first member has a control pin fixedly mounted thereon, the first sensor includes a first hydraulic actuator having a piston rod and a cylinder portion, the cylinder portion of the first actuator being mounted with respect to the second member of the tongue assembly in a first sensing position with its piston rod extending in a direction to engage the control pin on the first member so that movement of the first member in the first direction relative to the second member causes retraction of the piston rod into the cylinder portion of the first actuator, and the sensor includes a second hydraulic actuator having a pistonrod and a cylinder portion, the cylinder portion of the second actuator being mounted with respect to the second member of the tongue assembly in a first sensing position with its piston rod extending in a direction to engage the control pin on the first member so that movement of the first member in the second direction relative to the second member causes retraction of the piston rod into the cylinder portion of the second actuator.

10. The powered trailer of claim 9 wherein the reversing means comprises:
  means for pivotably mounting the first and second hydraulic actuators with respect to the second member for simultaneously:
    (a) placing the first hydraulic actuator in a second sensing position with its piston rod extending in direction to engage the control pin on the first member so that movement of the first member in the second direction relative to the second member causes retraction of the piston rod into the cylinder portion of the first actuator, and
    (b) placing the second hydraulic actuator in a second sensing position with its piston rod extending in direction to engage the control pin on the first member so that movement of the first member in the first direction relative to the second member causes retraction of the piston rod into the cylinder portion of the second actuator.

11. The powered trailer of claim 10 wherein the hydraulic actuators are both in their unactivated state when the control pin is positioned in a home position between them so that neither piston rod of the first and second actuators is retracted within its respective cylinder portion, and wherein the pivotal mounting means comprises:
  a mounting plate for the first and second actuators which is rotatable with respect to the second member about an axis defined by the control pin when in its home position.

12. The powered trailer of claim 11 and further comprising:

locking means for fixing the position of the rotatable mounting plate in two positions, a first position wherein the first and second actuators are in their first sensing positions and a second sensing position wherein the first and second actuators are in their second sensing positions.

13. The powered trailer of claim 11, wherein the control pin extends through an opening in the mounting plate, and said opening is configured as a slot to permit movement of the control pin in the first and second directions with respect to the mounting plate when the first and second hydraulic actuators are in their first and second sensing positions.

14. The powered trailer of claim 11 wherein the means for preventing includes slot means in the mounting plate configured for permitting movement of the control pin in the first and second directions only when the actuators are in their first and second sensing positions and for limiting rotation of the mounting plate when both of the sensors are not in their unactivated states.

* * * * *